(12) United States Patent
Tsai et al.

(10) Patent No.: US 6,772,528 B2
(45) Date of Patent: Aug. 10, 2004

(54) INCREMENTAL OFFSET MEASUREMENT INSTRUMENT

(75) Inventors: Ming Fa Tsai, Panchiao (TW); Shan Chang Wang, Lung Tan Hsiang (TW); Yi-Tung Lin, Hsinchuang (TW)

(73) Assignee: Nan Ya Technology Corporation, Taoyuan Hsien (TW)

( * ) Notice: Subject to any disclaimer, the term of this patent is extended or adjusted under 35 U.S.C. 154(b) by 0 days.

(21) Appl. No.: 10/200,497

(22) Filed: Jul. 23, 2002

(65) Prior Publication Data

US 2004/0016140 A1 Jan. 29, 2004

(51) Int. Cl.[7] .................................................. G01B 5/02
(52) U.S. Cl. .......................................... 33/549; 33/833
(58) Field of Search ......................... 33/549, 832, 833, 33/836, 550, 551, 553, 542, 543, 545, 546, 554, 555

(56) References Cited

U.S. PATENT DOCUMENTS

| | | | | | |
|---|---|---|---|---|---|
| 4,166,323 A | * | 9/1979 | Maag | ........................... | 33/551 |
| 4,251,922 A | * | 2/1981 | Perlotto | ....................... | 33/551 |
| 4,679,330 A | * | 7/1987 | Williams | ...................... | 33/550 |
| 5,419,056 A | * | 5/1995 | Breitenstein | .................. | 33/550 |
| 5,539,992 A | * | 7/1996 | Woodhouse | .................. | 33/550 |

* cited by examiner

Primary Examiner—Christopher W. Fulton
(74) Attorney, Agent, or Firm—Browdy and Neimark, P.L.L.C.

(57) ABSTRACT

An incremental offset measuring instrument is provided. The incremental offset measuring instrument includes a main base; a specimen seat mounted on the main base for resting a specimen; a measuring tool assembly for measuring the specimen; and a movable assembly mounted on the main base, wherein the movable assembly carries the measuring tool assembly, thereby achieving the goal of measuring the specimen.

27 Claims, 11 Drawing Sheets

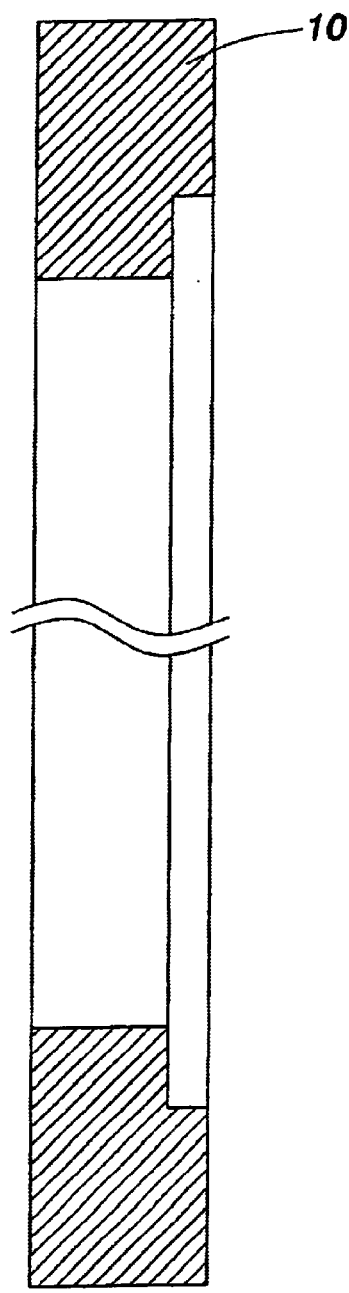 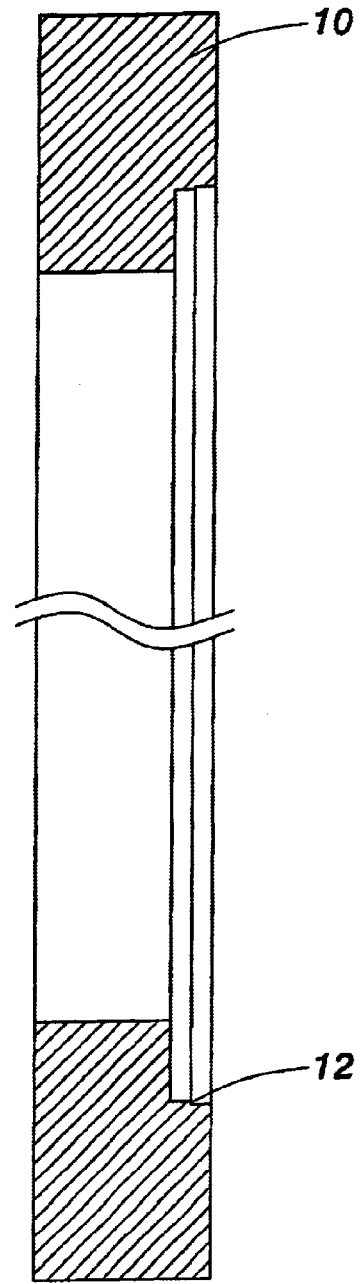
FIG.2
PRIOR ART
FIG.3
PRIOR ART

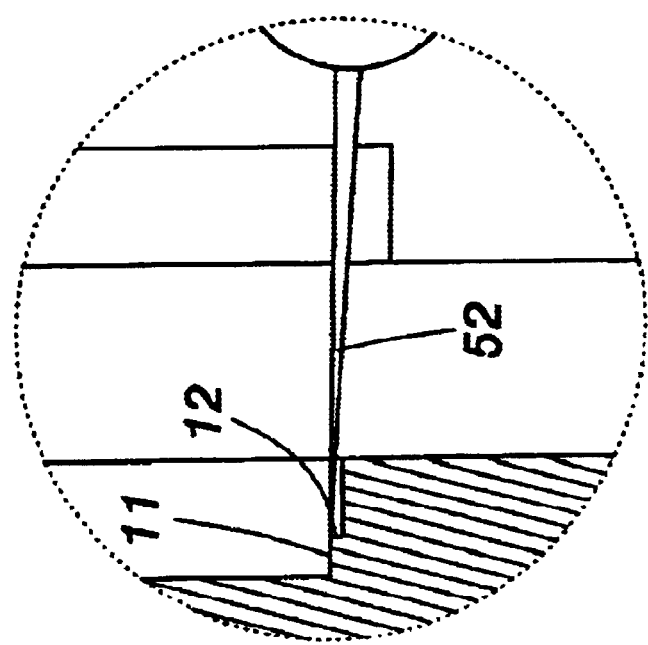

INCREMENTAL OFFSET MEASUREMENT INSTRUMENT

BACKGROUND OF THE INVENTION

1. Field of the Invention

The present invention relates to an incremental offset measuring instrument for accurately determining dimensions of objects, thereby reducing product loss during manufacturing processes.

2. Description of the Prior Art

Please refer to FIG. 1. FIG. 1 is a typical view of a prior art guide ring 10 and a wafer 15 to-be-polished. As shown in FIG. 1, the wafer 15 is subject to a typical polishing process in order to remove a layer of material from the wafer surface. During the polishing process, the wafer 15 is protected and restrained by the guide ring 10. In an ideal case, the diameter of the wafer 15 is equal to the inner diameter of the guide ring 10 so that the water 15 can be fittingly placed in the guide ring 10. It is known that large space between the wafer peripheral and the guide ring 10 can cause sever collision or even drop off of the wafer 15 during the polishing process.

However, a very small space between the wafer peripheral and the guide ring 10 and collision are usually inevitable during mass production. Frequent collision of wafers results in incremental offset of the inner diameter of the guide ring 10. A step cross section of the guide ring 10 is observed due to incremental offset of the inner diameter of the guide ring 10. Referring to FIG. 2, the cross section of the guide ring 10 without a step cross section is shown. Referring to FIG. 3, the cross section of the guide ring 10a with a step cross section is shown. When the step difference 12 exceeds a predetermined value, the wafer 15 is subject to sliding out of the guide ring 10 during the polishing process and may be broken. Consequently, it is an important task of measuring friction loss of the guide ring 10 and the step difference 12.

Referring to FIG. 4 and FIG. 5, a typical way to the measurement of the step difference 12 of the guide ring 10 is according to experience of an operator. When measuring, the operator uses his nail of a finger as a measuring tool, thereby determining if the guide ring 10 can be used in the next polishing process or not. However, the prior art method is not accurate and cannot obtain quantified data that can be used as a basis for effective management of wafer polishing process.

SUMMARY OF THE INVENTION

It is therefore a primary object of the present invention to provide an incremental offset or step difference measuring instrument for accurately measuring the step difference of a guide ring.

Another object of the present invention is to provide an incremental offset or step difference measuring instrument for accurately measuring the step difference of a guide ring and obtaining quantified data that are used as a basis of a wafer polishing management standard.

Still another object of the present invention is to provide an incremental offset or step difference measuring instrument for accurately measuring the step difference of a guide ring thereby determining the lifetime of the guide ring and decreasing the cost of production.

Still another object of the present invention is to provide an incremental offset or step difference measuring instrument for accurately measuring the step difference of a guide ring thereby avoiding a dropped wafer from damaging pricey semiconductor equipment.

According to the claimed invention, an incremental offset measuring instrument is provided. The incremental offset measuring instrument includes a main base; a specimen seat mounted on the main base for resting a specimen; a measuring tool assembly for measuring the specimen; and a movable assembly mounted on the main base, wherein the movable assembly carries the measuring tool assembly, thereby achieving the goal of measuring the specimen.

It is to be understood that both the forgoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

FIG. 2 is a cross sectional view of a guide ring without a step difference.

FIG. 3 is a cross sectional view of a guide ring with a step difference.

FIG. 9A is an enlarged view of FIG. 9.

DETAILED DESCRIPTION OF THE PREFERRED EMBODIMENT

Figure 6:
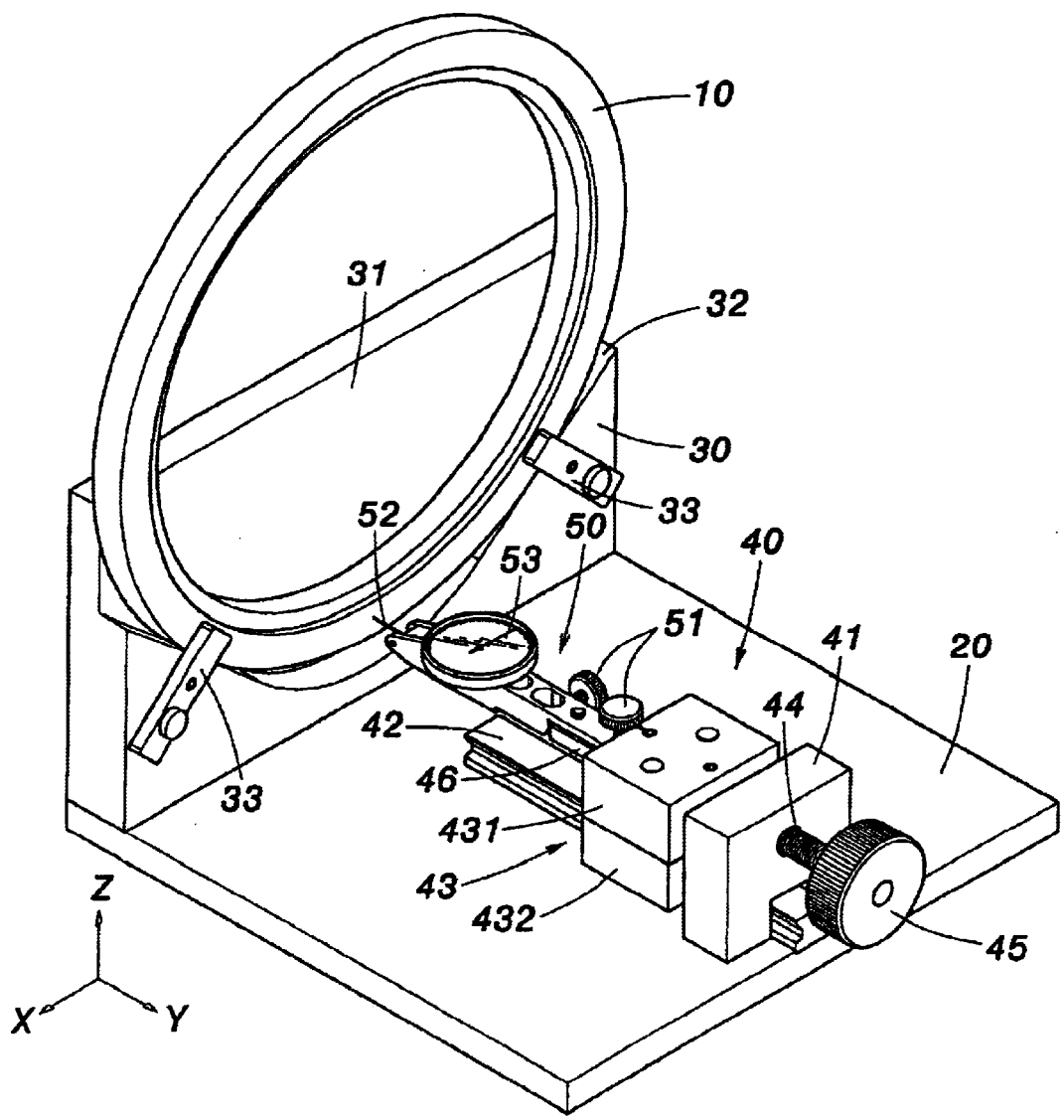
FIG. 6 is a typical view of the incremental offset measuring instrument of this invention.
Figure 9:
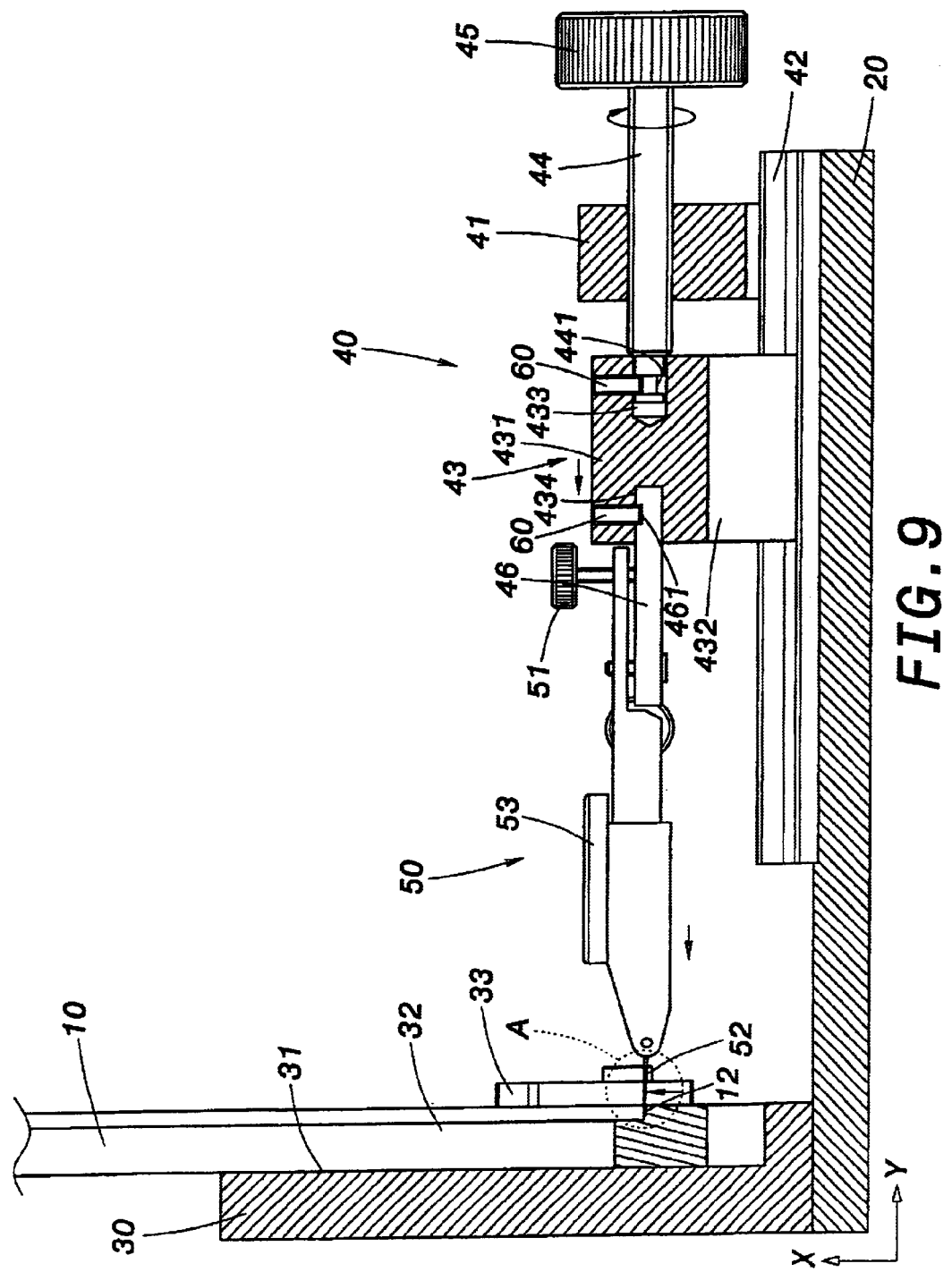
FIG. 9 is the same as FIG. 8, but showing the backward movement.

Please refer to FIG. 6. This invention provides an incremental offset measuring instrument for accurately measuring the step difference of a guide ring. The incremental offset measuring instrument of the present invention mainly includes a main base 20, a specimen seat 30, a movable assembly 40, and a measuring tool assembly 50. The specimen seat 30 and the movable assembly 40 are fixed on the main base 20. Guide ring 10 is placed on the specimen seat 30. The measuring tool assembly 50 is mounted on the movable assembly 40. By using the movable assembly 40, the measuring tool assembly 50 is capable of approaching the guide ring 10 and measuring the step difference of the guide ring 10, as shown in FIG. 9.

The main base 20 is a level basis platform having the specimen seat 30 and movable assembly 40 thereon. A positioning surface 32 is formed on the specimen seat 30. Preferably, the positioning surface 32 has a V shaped cross section for adapting various sizes of guide rings 10. A vertical wall 31 of the specimen seat 30 is provided to position the guide ring 10 in a vertical manner. When in use, a rear surface of the guide ring 10 leans against the vertical wall 31. The opposite side (the side to be measured) of the guide ring 10 faces the measuring tool assembly 50. As illustrated, the guide ring 10 is tightly fixed in the specimen seat 30 by using two stopping pieces 33.

Figure 7:
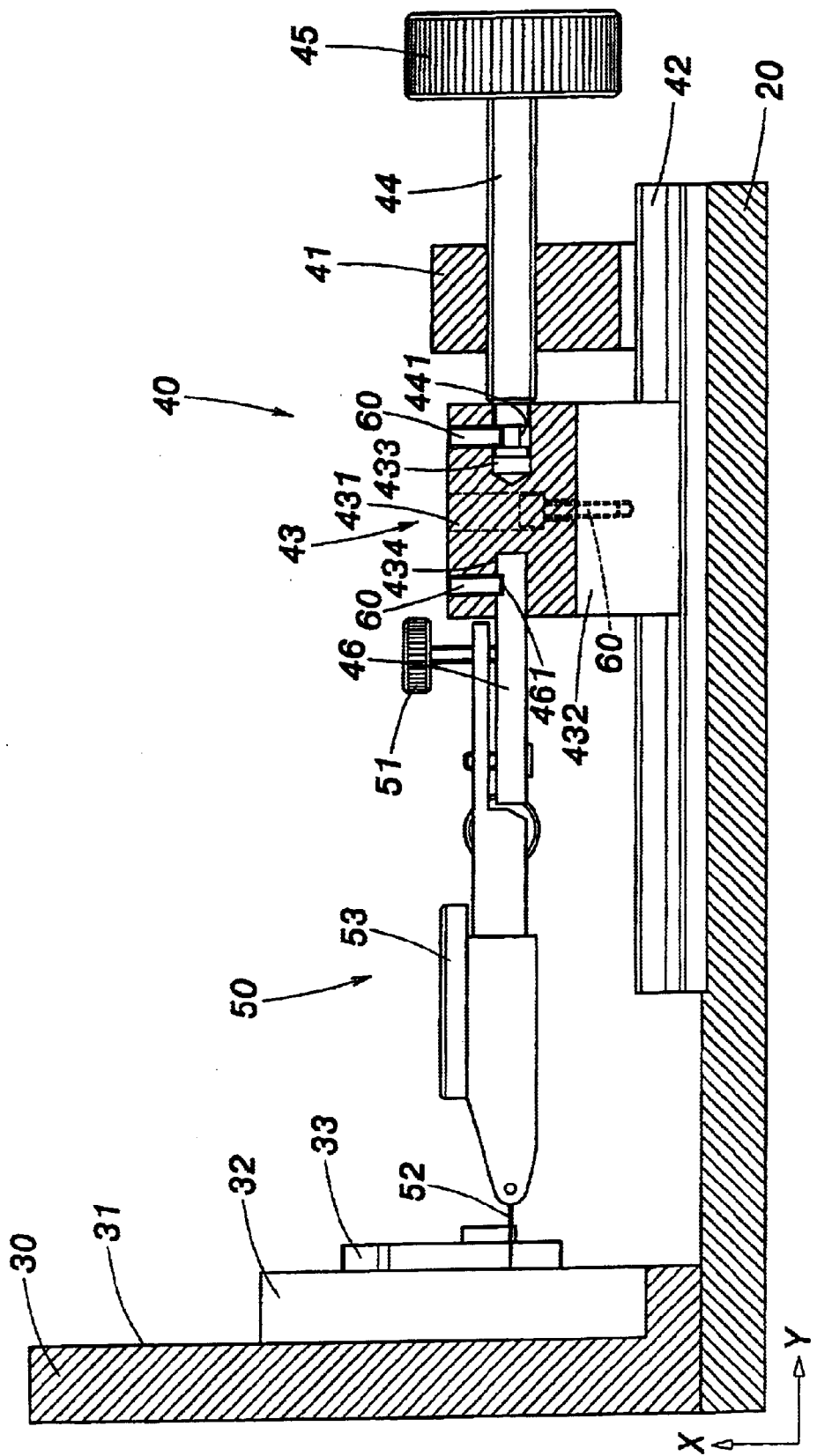
FIG. 7 is a cross-sectional view of the incremental offset measuring instrument of this invention.

Referring to FIG. 7 with reference to FIG. 6, the movably assembly 40 is placed at a front side of the main base 20. The movably assembly 40 carries the measuring tool assembly 50. The movably assembly 40 includes a guide rail 42, a fixed base 41, a sliding base 43, and a threaded rod 44. The guide rail 42 and the fixed base 41 are secured to the main base 20. The sliding base 43 has a sliding groove (not explicitly shown in FIG. 7) corresponding to the guide rail 42. When assembly, the sliding base 43 fittingly engages with the guide rail 42 so that the sliding base 43 can move along the length of the guide rail 42. The threaded rod 44 passes an aperture having a threaded interior surface of the fixed base 41 and is supported by the fixed base 41. One end of the threaded rod 44 is pivotally mounted on the sliding base 43. As illustrated, when the threaded rod 44 rotates, the sliding base 43 engaging with the guide rail 42 moves along Y-direction. A rotation button 45 may be disposed on the other end of the threaded rod 44 for facilitating the rotation of the threaded rod 44 with fingers. A connecting rod 46, which is secured to the sliding base 43 by means of a screw 60, is connected to the measuring tool assembly 50. The connecting rod 46 is used to fasten the measuring tool assembly 50. The measuring tool assembly 50 is used to measure the guide ring 10 placed on the specimen seat 30. The measuring tool assembly 50 is preferably a commercial leverage-type micro-measurement instrument. The gauge is secured to the connecting rod 46 with X-direction and Z-direction adjusting screws 51. The position of the measuring tool assembly 50 may be adjusted by adjusting the X-direction and Z-direction adjusting screws 51.

The sliding base 43 of the movable assembly 40 includes an upper portion 431 and a lower portion 432. The sliding groove (not shown) is formed on the lower portion 432 for engaging with the guide rail 42. The upper portion 431 is secured to the lower portion 432 by screw 60. A first hole 433 is provided at one side of the upper portion 431 for accommodating the front end of the threaded rod 44. A groove 441 is provided at the front end of the threaded rod 44. The screw 60 engages with the groove 441 of the threaded rod 44. With such configuration, the threaded rod 44 is pivotally connected with the upper portion 431. A recess 461 is provided on the connecting rod 46. The connecting rod 46 is inserted into a second hole 434 of the upper portion 431 and the screw 60 engages with the recess 461 of the connecting rod 46.

Figure 1:
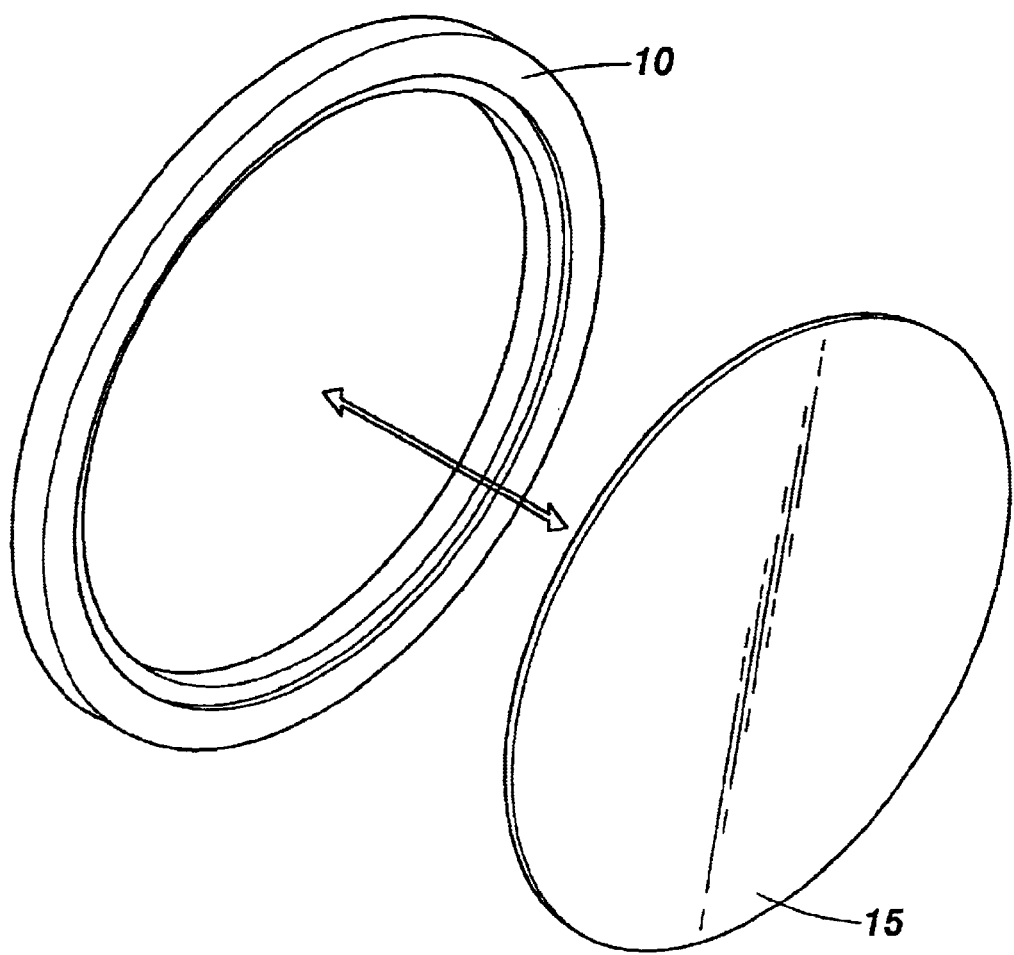
FIG. 1 is a typical view of prior art guide ring and wafer.
Figure 4:
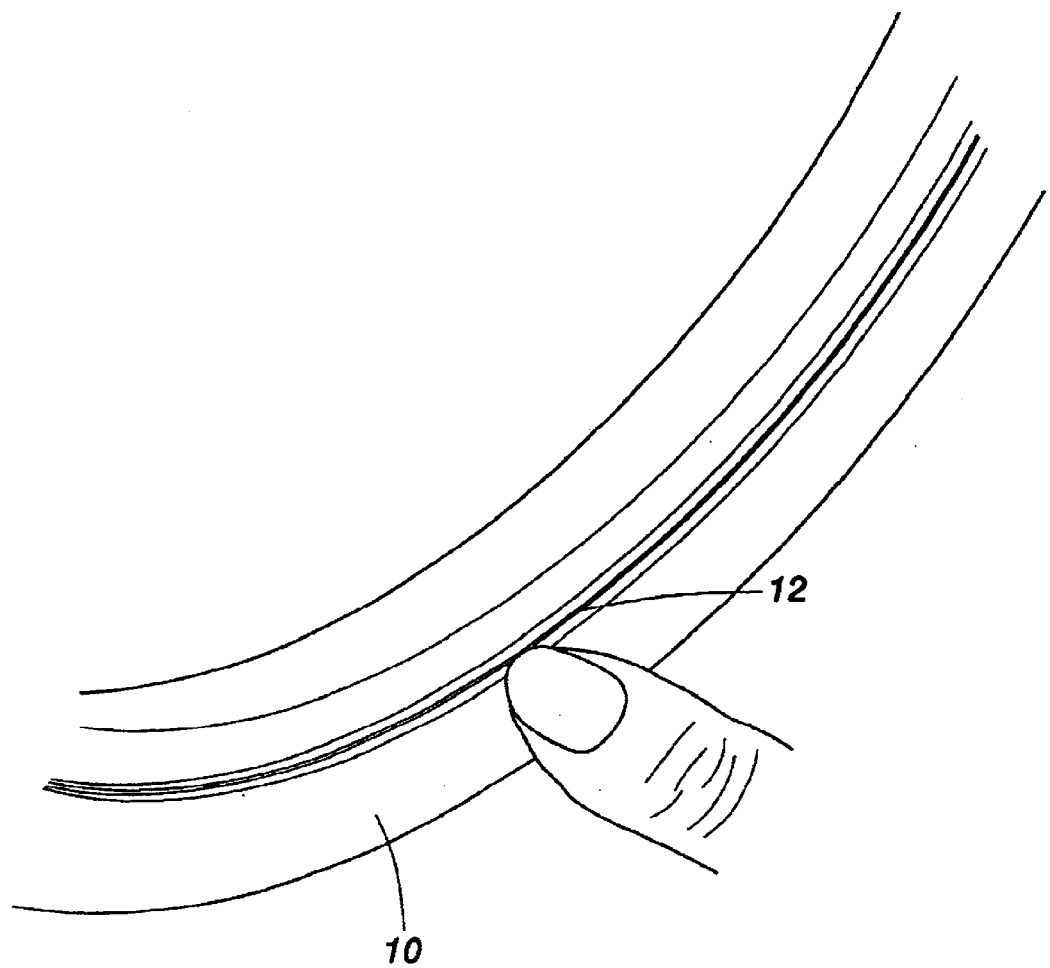
FIG. 4 and FIG. 5 are schematic diagrams showing the prior art method of manual measurement of step difference of the guide ring.
Figure 5:
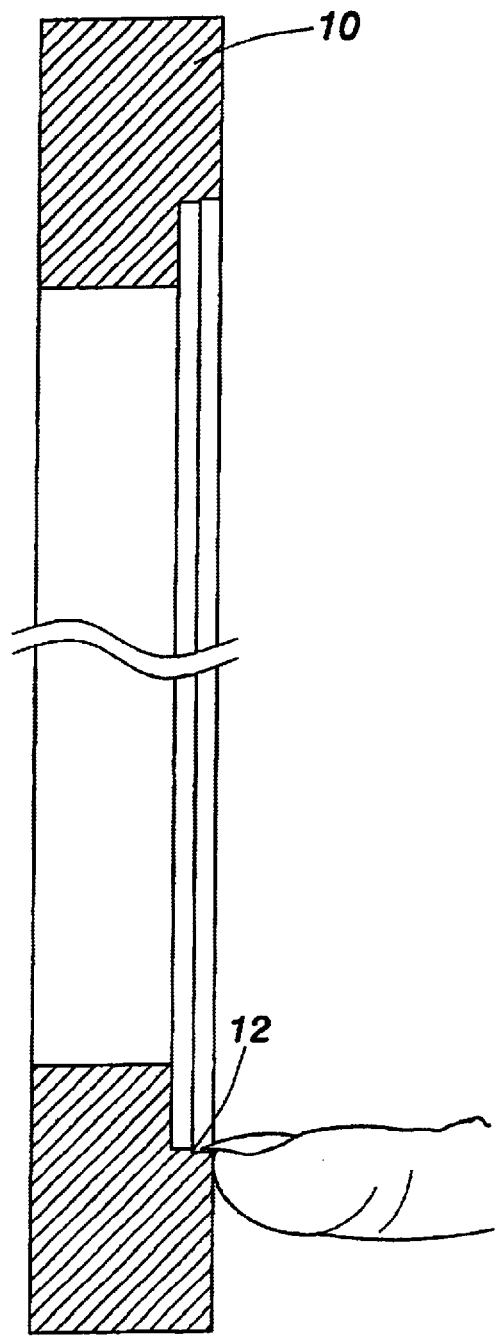
Figure 8:
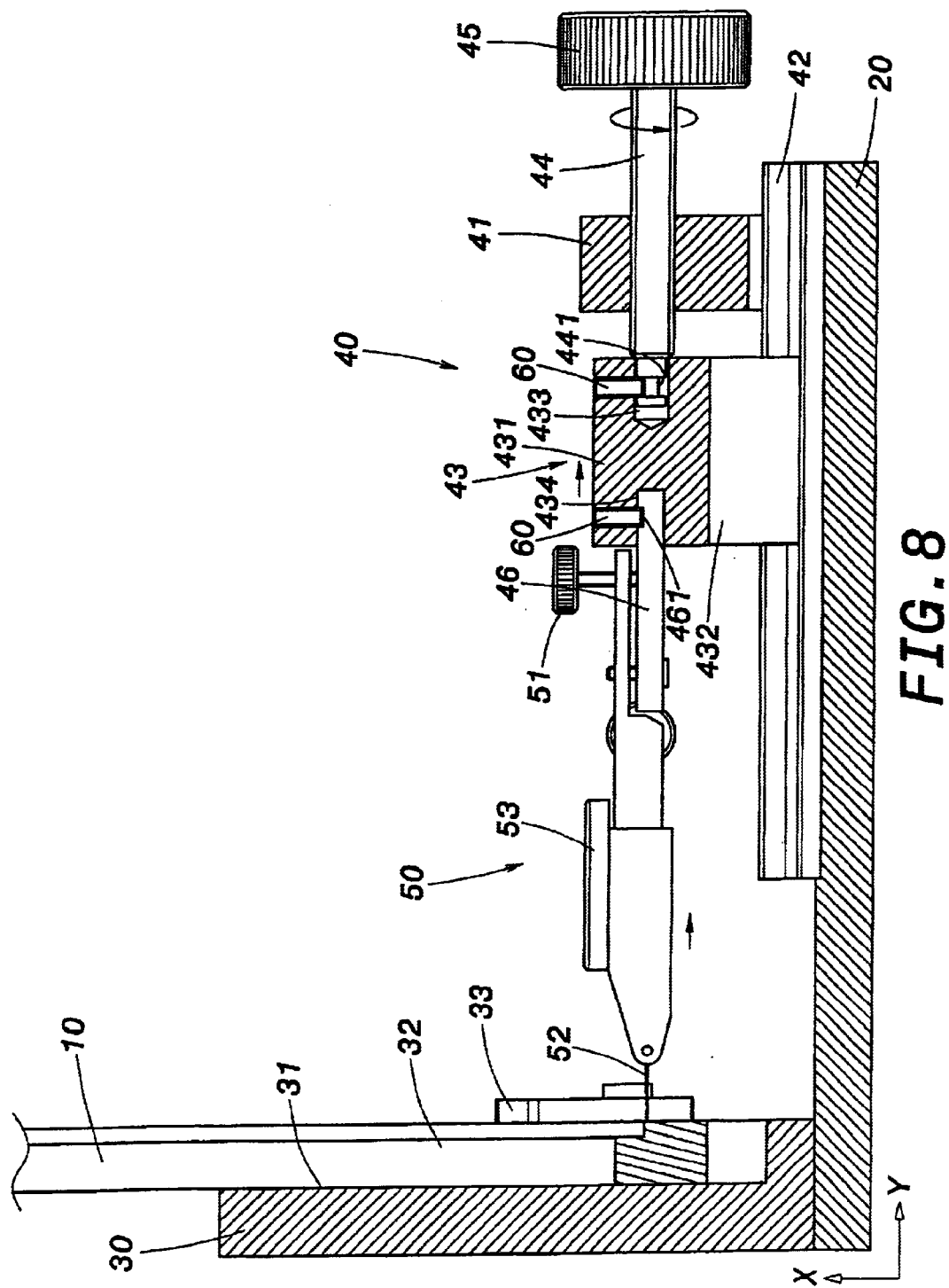
FIG. 8 is a schematic diagram showing the forward movement of the measuring tool assembly according to the present invention.
Figure 10:
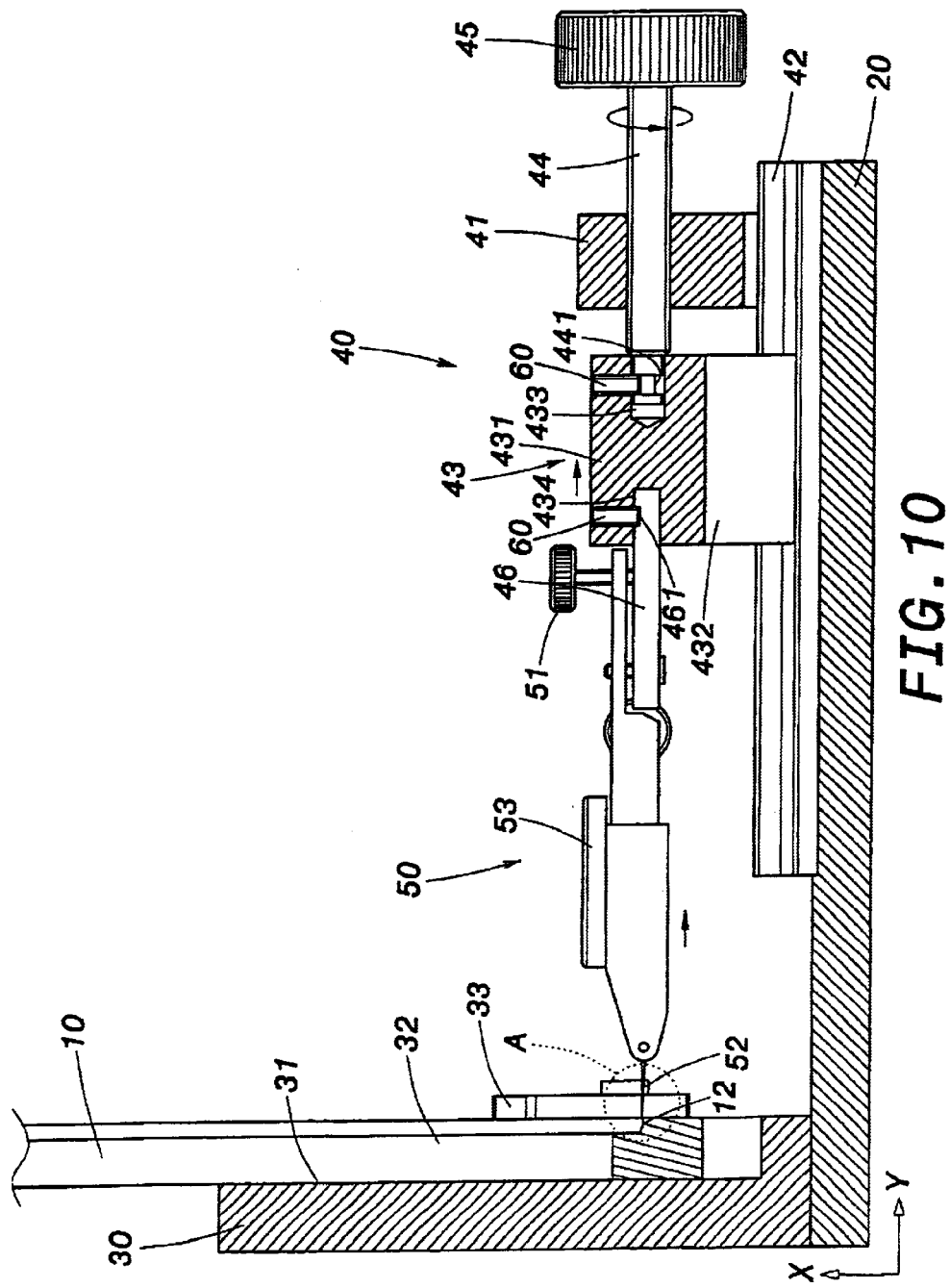
FIG. 10 is a cross sectional diagram showing the forward movement of the measuring tool assembly according to the present invention.
Figure 10A:
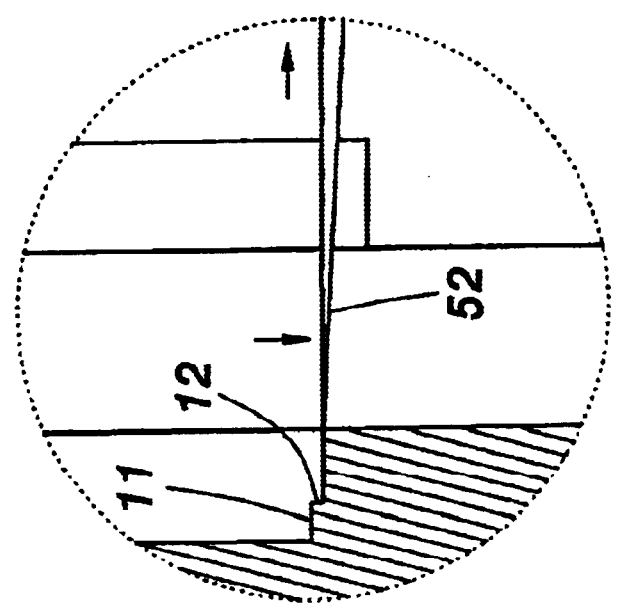
FIG. 10A is an enlarged view of FIG. 10.

Referring to FIG. 8 through FIG. 10, the operation procedures of the present invention are now discussed. First, dust on the guide ring 10 is wiped off. Second, as shown in FIG. 8, button 45 is rotated in a counterclockwise direction to move the measuring tool assembly (leverage-type micro-measurement instrument) 50 away from the specimen seat 30. As shown in FIG. 8, the guide ring 10 is placed on the positioning surface 32 of the specimen seat 30. Then, as shown in FIG. 9, button 45 is rotated in a clockwise direction to move the probe 52 of the leverage-type micro-measurement instrument 50 toward the guide ring 10. Next, as shown in FIG. 9, the probe 52 of the leverage-type micro-measurement instrument 50 is slightly uplifted with fingers and move the probe 52 forward to the basis surface 11 of the guide ring 10 (also see FIG. 9A). Next, as shown in FIG. 9, the gauge 53 of the leverage-type micro-measurement instrument 50 is zeroed. Finally, as shown in FIG. 10, button 45 is rotated in a counterclockwise direction to move the probe 52 away from the guide ring 10 so as to measure the step difference of the step cross section of the guide ring 10 (also see FIG. 1A).

It should be understood that the present invention can be used to measure other objects. The measurement is based on the measuring tool assembly 50 and the displacement of the measuring tool assembly 50.

To sum up, the present invention provides an effective way to avoid manual errors from occurring. The friction loss of the guide ring and the degree of the step difference are quantified. Measured data according to the present invention can be used as a basis of determining lifetime of the guide ring and standard of recycling use of the guide ring. Further, the production cost is reduced.

Those skilled in the art will readily observe that numerous modification and alterations of the device may be made while retaining the teachings of the invention. Accordingly, the above disclosure should be construed as limited only by the metes and bounds of the appended claims.

What is claimed is:

1. An incremental offset measuring instrument for accurately measuring a guide ring having a step difference created by a wafer received in the guide ring, the instrument comprising:

a horizontal main base;

a specimen seat perpendicularly disposed on the main base, and the specimen seat having a V shaped anvil for standing the guide ring thereon;

a leverage-type micro-measurement tool having a probe for measuring the step difference formed on an inner surface of the guide ring; and a movable assembly mounted on the main base, wherein the movable assembly on which the lever-type micro-measurement tool is coupled carries the tool to move in a predetermined direction.

2. The incremental offset measuring instrument of claim 1 wherein the movable assembly comprises:

a fixed base mounted on the main base;

a guide rail mounted on the main base;

a sliding base engaging with the guide rail so that the sliding base slides along the length of the guide rail; and a threaded rod supported by the fixed base, wherein the threaded rod has one end pivotally connected to the sliding bass and by rotating the threaded rod the sliding base moves along the guide rail.

3. The incremental offset measuring instrument of claim 2 wherein the sliding base moves along Y-direction.

4. The incremental offset measuring instrument of claim 2 wherein the movable assembly further comprises a connecting rod connecting the sliding base with the measuring tool assembly.

5. The incremental offset measuring instrument of claim 2 wherein the movable assembly further comprises at least one adjusting screw for screwing the measuring tool assembly on the connecting rod and is able to adjust the position of the measuring tool assembly.

6. The incremental offset measuring instrument of claim 5 wherein the adjusting screw is used to adjust the X-direction level of the measuring tool assembly.

7. The incremental offset measuring instrument of claim 5 wherein the adjusting screw is used to adjust the Z-direction level of the measuring tool assembly.

8. The incremental offset measuring instrument of claim 2 wherein the sliding base further comprises:

a upper portion accepting front end of the threaded rod; and a lower portion secured to the upper portion, wherein the lower portion engages with the guide rail.

9. The incremental offset measuring instrument of claim 2 wherein a button is provided at one end of the threaded rod, when rotating the button, the threaded rod is also rotated.

10. The incremental offset measuring instrument of claim 1 wherein the specimen seat further comprises a positioning surface and a vertical wall for positioning the specimen.

11. The incremental offset measuring instrument of claim 1 wherein the specimen seat further comprises a stopping piece for keeping the specimen in place.

12. The incremental offset measuring instrument of claim 1 wherein the measuring tool assembly is a leverage-type micro-measurement instrument.

13. An incremental offset measuring instrument, comprising:

a main base;

a specimen seat on the main base, the specimen seat perpendicularly disposed on the main base and having a V-shaped anvil for standing and positioning a guide ring thereon;

a movable assembly comprising a fixed base, a guide rail, a sliding base, a threaded rod, and a connecting rod, wherein the fixed base and the guide rail are mounted on the main base, the sliding base engages with the guide rail so that the sliding base slides along the length of the guide rail, threaded rod is supported by the fixed base, wherein the threaded rod has one end pivotally connected to the sliding base and by rotating the threaded rod the sliding base moves along the guide rail, the connecting rod connects the sliding base with the measuring tool assembly; and wherein the movable assembly carries a leverage-type micro-measurement tool having a probe for measuring a step difference formed on an inner surface of the guide ring.

14. The incremental offset measuring instrument of claim 13 wherein the sliding base moves along Y-direction.

15. The incremental offset measuring instrument of claim 13 wherein the movable assembly further comprises at least one adjusting screw for screwing the measuring tool assembly on the connecting rod and is able to adjust the position of the measuring tool assembly.

16. The incremental offset measuring instrument of claim 15 wherein the adjusting screw is used to adjust the X-direction level of the measuring tool assembly.

17. The incremental offset measuring instrument of claim 15 wherein the adjusting screw is used to adjust the Y-direction level of the measuring tool assembly.

18. The incremental offset measuring instrument of claim 13 wherein the sliding base further comprises:

a upper portion accepting front end of the threaded rod; and a lower portion secured to the upper portion, wherein the lower portion engages with the guide rail.

19. The incremental offset measuring instrument of claim 13 wherein the specimen seat further comprises a positioning surface and a vertical wall for positioning the guide ring.

20. The incremental offset measuring instrument of claim 13 wherein the specimen seat further comprises a stopping piece for keeping the specimen in place.

21. The incremental offset measuring instrument of claim 13 wherein a button is provided at one end of the threaded rod, when rotating the button, the threaded rod is also rotated.

22. The incremental offset measuring instrument of claim 13 wherein the measuring tool assembly is a leverage-type micro-measurement instrument.

23. An incremental offset measuring instrument, comprising:

a main base;

a specimen seat mounted on the main base for resting and positioning a specimen, wherein the specimen seat comprises a positioning surface and a vertical wall for positioning the specimen, a stopping piece is provided for keeping the specimen in place;

a movable assembly comprising a fixed base, a guide rail, a sliding base, a threaded rod, and a connecting rod, wherein the fixed base and the guide rail are mounted on the main base, the sliding base comprises:

a upper portion accepting front end of the threaded rod; and a lower portion secured to the upper portion, wherein the lower portion engages with the guide rail the sliding base engages with the guide rail so that the sliding base slides along the length of the guide rail, threaded rod is supported by the fixed base, wherein the threaded rod has one end pivotally connected to the upper portion of the sliding base and by rotating the threaded rod the sliding base moves along the guide rail, the connecting rod connects the sliding base with the measuring tool assembly, a button is provided at one end of the threaded rod, when rotating the button, the threaded rod is also rotated; and wherein the movable assembly further comprises at least one adjusting screw for screwing the measuring tool assembly on the connecting rod and is able to adjust the position of the measuring tool assembly, the movable assembly carries a measuring tool assembly, thereby achieving the goal of measuring the specimen.

24. The incremental offset measuring instrument of claim 23 wherein the sliding base moves along Y-direction.

25. The incremental offset measuring instrument of claim 23 wherein the adjusting screw is used to adjust the X-direction level of the measuring tool assembly.

26. The incremental offset measuring instrument of claim 23 wherein the adjusting screw is used to adjust the Y-direction level of the measuring tool assembly.

27. The incremental offset measuring instrument of claim 23 wherein the measuring tool assembly is a leverage-type micro-measurement instrument.

* * * * *